(12) United States Patent
Malkowski, Jr. et al.

(10) Patent No.: US 8,420,935 B2
(45) Date of Patent: Apr. 16, 2013

(54) BUS SUPPORT SYSTEM FOR A MOTOR CONTROL CENTER

(75) Inventors: Chester Malkowski, Jr., Franklin, WI (US); James H. Meriwether, Muscoda, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 772 days.

(21) Appl. No.: 12/484,879

(22) Filed: Jun. 15, 2009

(65) Prior Publication Data
US 2010/0314166 A1 Dec. 16, 2010

(51) Int. Cl.
*H02G 5/06* (2006.01)
*H02G 5/00* (2006.01)

(52) U.S. Cl.
USPC ..... 174/72 B; 174/71 B; 174/70 B; 174/68.2; 361/624; 361/611; 439/212

(58) Field of Classification Search .............. 174/137 R, 174/72 B, 71 B, 88 B, 70 B, 99 B, 129 B, 174/133 B, 149 B, 68.2, 174; 248/351; 361/600, 361/601, 624, 627, 637, 639, 648, 675, 641, 361/664, 611; 439/212, 213, 114, 210
See application file for complete search history.

(56) References Cited

U.S. PATENT DOCUMENTS

| | | | | | |
|---|---|---|---|---|---|
| 4,307,304 | A | * | 12/1981 | Kovatch et al. | 174/71 B |
| 4,366,528 | A | * | 12/1982 | Cole | 174/133 B |
| 5,905,631 | A | * | 5/1999 | Winkler | 361/641 |
| 6,111,745 | A | * | 8/2000 | Wilkie et al. | 174/68.2 |
| 6,169,248 | B1 | * | 1/2001 | Rowe et al. | 174/72 B |
| 6,381,122 | B2 | * | 4/2002 | Wagener | 361/611 |
| 6,781,818 | B2 | * | 8/2004 | Josten et al. | 361/611 |
| 6,934,147 | B2 | * | 8/2005 | Miller et al. | 174/68.2 |
| 7,063,572 | B2 | | 6/2006 | Brandt et al. | |
| 7,511,946 | B2 | * | 3/2009 | Malkowski et al. | 361/648 |
| 7,719,823 | B2 | * | 5/2010 | Josten et al. | 361/611 |
| 7,786,384 | B2 | * | 8/2010 | Diaz | 174/88 B |

* cited by examiner

*Primary Examiner* — Angel R Estrada
(74) *Attorney, Agent, or Firm* — Fletcher Yoder, P.C.; Alexander R. Kuszewski; John M. Miller

(57) ABSTRACT

A bus support system is provided. The bus support system includes a bus support having a plurality of vertical channels configured to receive vertical bus conductors, each of the plurality of vertical channels having a rear protrusion on a rear side of the bus support. The bus support system also includes a plurality of add-on bus support braces disposed on the rear side of the bus support and configured to contact the plurality of channels to limit a movement of the vertical bus conductors during a high current event.

11 Claims, 8 Drawing Sheets

BUS SUPPORT SYSTEM FOR A MOTOR CONTROL CENTER

BACKGROUND

The present invention relates generally to electrical systems, such as for the distribution of power signals to controlled equipment, and particularly to a bus support system for such electrical systems.

Electrical systems with packaged electrical and electronic components are known and are in use. For example, motor control centers (MCCs) are used for power and data distribution in large and industrial operations. In a motor control center, a variety of components such as switchgear, semiconductor power electronic circuits, programmable logic controllers, motor controllers, and so forth are housed in large electrical enclosures that may be subdivided into compartments.

Typically, the MCC is connected to a main power line that feeds three-phase AC power into the MCC. The MCC includes associated bus bars, interconnections and supporting structures for distribution of electrical power to the various compartments. A typical arrangement includes vertical bus bars for each electrical phase of a multiple phase system which may include three power phases.

The vertical bus bars and other supporting structures should be able to withstand magnetic forces created by high circuit currents that pass through the MCC during a short circuit fault, or any other high current event. Typically, as the short circuit current flows through the bus bars, magnetic forces between adjacent bus bars act to move such bus bars laterally. Such movement of the bus bars must be prohibited to avoid damage within the MCC. Therefore, high short circuit current levels in the bus bars may require specially designed bus support structures with extensive bracing to withstand the high current levels. However, costs of manufacturing of such bus support system may be substantial.

Certain systems employ different bus support systems to withstand different levels of currents during operation. For example, a first bus support system may be employed for 42 kA and for 65 kA buses, and a different bus support system may be employed for 100 kA buses. However, this results in use of more material and expanded inventories, thereby substantially increasing the cost of the support system. Moreover, because fewer of the higher rated systems are typically made, the higher rated bus support systems do not benefit from the same economy of scale as do the lower rated support systems.

Accordingly, it would be desirable to develop a bus support system that provides sufficient strength to withstand high currents associated with short-circuits in an electrical system.

BRIEF DESCRIPTION

Briefly, according to one embodiment of the present invention, a bus support system is provided. The bus support system includes a bus support having a plurality of vertical channels configured to receive vertical bus conductors, each of the plurality of vertical channels having a rear protrusion on a rear side of the bus support. The bus support system also includes a plurality of add-on bus support braces disposed on the rear side of the bus support and configured to contact the plurality of channels to limit a movement of the vertical bus conductors during a high current event.

In accordance with another aspect, a motor control center is provided. The motor control center includes vertical and horizontal bus conductors disposed within an electrical enclosure and a bus support configured to support the vertical and horizontal bus conductors, wherein the bus support comprises a plurality of vertical channels configured to receive the vertical bus conductors, each of the plurality of vertical channels having a rear protrusion on a rear side of the bus support. The motor control center also includes a plurality of add-on bus support braces disposed on the rear side of the bus support and configured to contact the plurality of vertical channels to limit a movement of the vertical bus conductors during a high current event. In addition, the motor control center also includes a bus cover configured to cover the bus support and the vertical and horizontal bus conductors, the bus cover including openings for connecting electrical components to the vertical and horizontal bus conductors.

In accordance with another aspect, a bus support brace is provided. The bus support brace is configured to limit movement of vertical bus conductors in an electrical enclosure, wherein the bus support brace extends between at least two vertical channels receiving the vertical bus conductors.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique function to provide a bus support system for an electrical enclosure such as for a motor control center. In particular, the present technique utilizes add-on bus support braces on the bus support system to limit movement of vertical bus conductors within the enclosure during a high current event.

References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
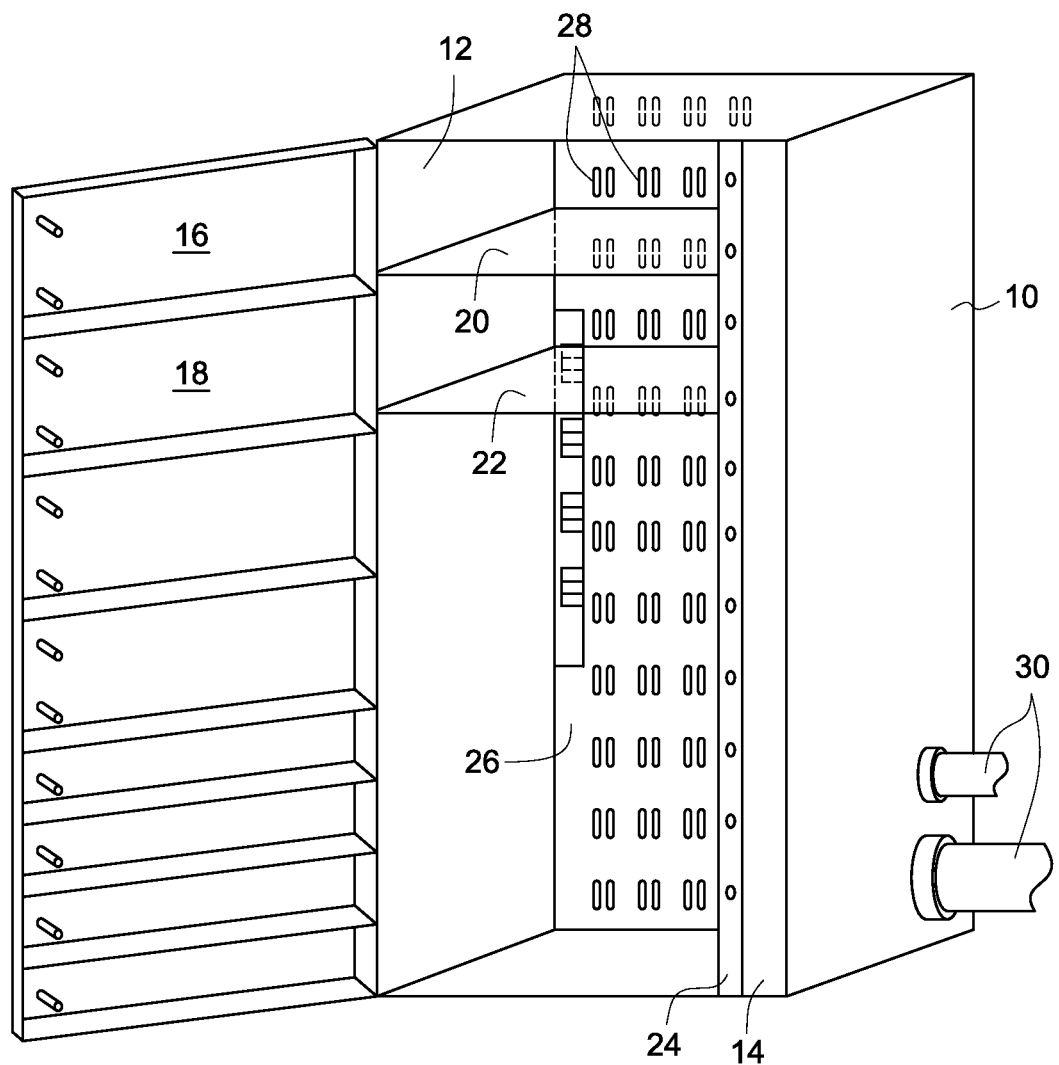
FIG. 1 is a perspective view of an exemplary electrical enclosure incorporating a bus support system in accordance with aspects of the present invention.

Turning now to the drawings and referring first to FIG. 1 an electrical enclosure 10 is illustrated in which electrical components of various types may be housed. The enclosure 10 may be suitable, for example, for assembly of a motor control center or other industrial, commercial, marine, or other electrical system. In general, the enclosure 10 forms a shell around a device mounting volume 12. The shell may be made of any suitable material, such as heavy gage sheet metal, reinforced plastics, and so forth. In the illustrated embodiment, the device mounting volume 12 is flanked by a wireway 14 in which line and load wiring, cabling and so forth may be installed to service the components within the device mounting volume 12.

Further, the enclosure 10 may include a plurality of doors such as represented by reference numerals 16 and 18 for covering individual compartments such as represented by reference numeral 20 and 22 or other structures that support the electrical components. Each of the individual compartments 20 and 22 may contain an assembly of components that are supported within the compartment via known methods like screwed or snap-in engagement, thereby providing mechanical and electrical connection to the system. Exemplary components in the unit may include relays, motor starters, programmable logic controllers (PLC), among others.

A latch rail 24 may be provided adjacent to the device mounting volume 12 to interface with latches on the individual doors 16 and 18. Along a rear wall of the enclosure 10 is disposed a bus system 26 configured to facilitate distribution of power throughout the enclosure 10 in a plug-in manner. The bus system 26 is generally formed as a backplane having slots 28 for receiving conventional stab-type electrical connections on rear surfaces of device supports received within the enclosure 10. Such slot and stab arrangements are generally known in the art. As illustrated, the slots 28 are divided in pairs to receive corresponding two-pronged stab for each phase of electrical power. Rows of such slots 28 may be provided to allow device supports to be mounted at various levels within the enclosure 10.

In the illustrated embodiment, electrical power and data signals are provided to the enclosure 10 via appropriate conduits as indicated generally by reference numeral 30. In a presently contemplated configuration, the bus system 26 includes a series of power busses including vertical and horizontal bus conductors that will be described in greater detail below.

Figure 2:
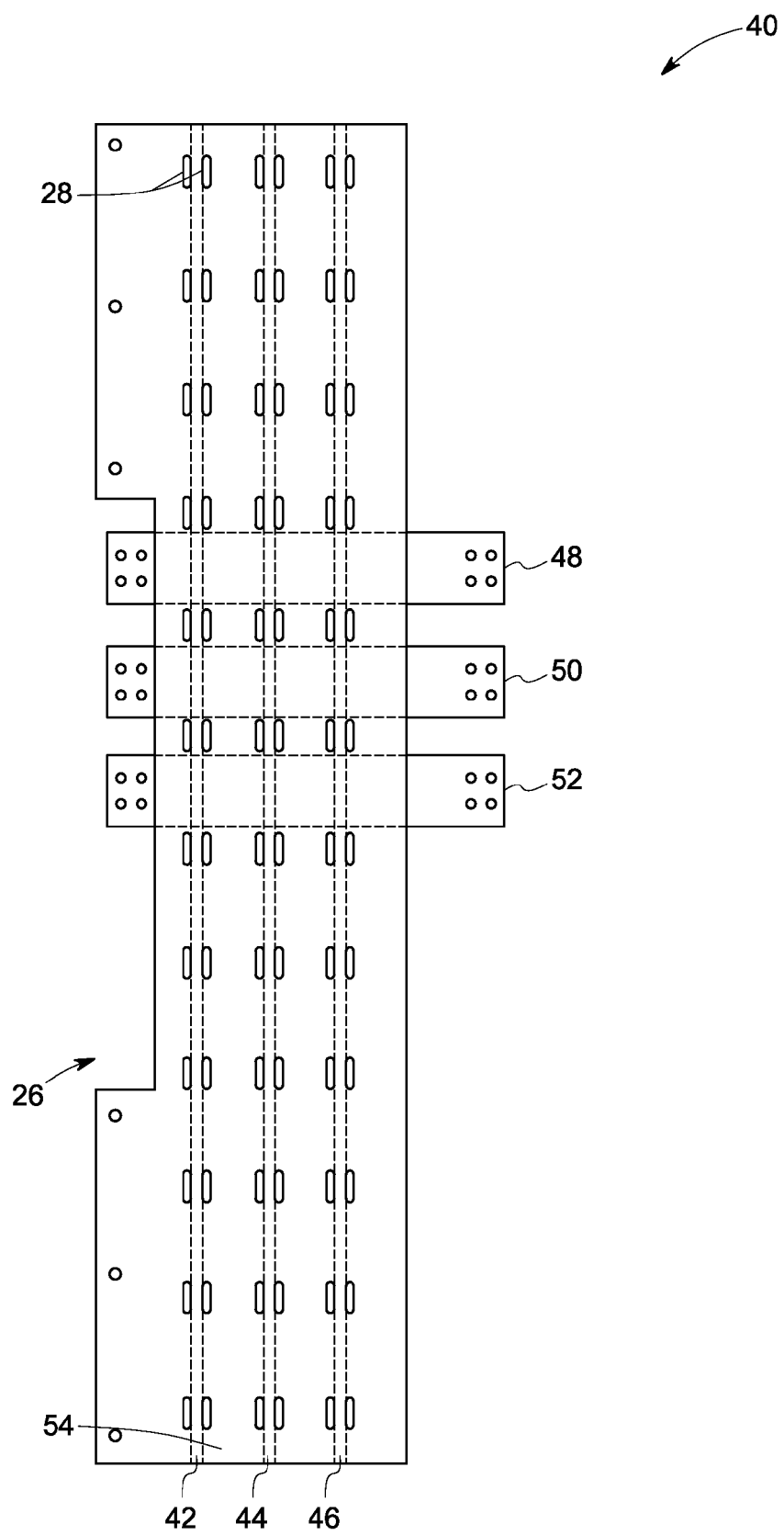
FIG. 2 illustrates an exemplary configuration of the bus system of FIG. 1. in accordance with aspects of the present invention.

FIG. 2 illustrates an exemplary configuration 40 of the bus system 26 of FIG. 1. As illustrated, the bus system 26 includes and supports a plurality of power busses disposed within the electrical enclosure 10. In the illustrated embodiment, the bus system 40 includes vertical bus conductors such as represented by reference numeral 42, 44 and 46. Further, the bus system 40 includes horizontal bus conductors such as represented by reference numerals 48, 50 and 52. In the illustrated embodiment, the vertical and horizontal bus conductors include three-phase conductors. In certain embodiments, the horizontal bus conductors 48, 50 and 52 may be coupled to cabling that supplies three-phase power from an external power supply such as a power supply grid.

Moreover, the bus system 40 includes a bus cover 54 and a rear bus support that will be described in greater detail below. In the illustrated embodiment, the bus cover 54 includes a molded sheet of synthetic material disposed over the vertical and horizontal bus conductors and serves to prevent contact with underlying power busses except through the slots 28. The vertical bus conductors 42, 44 and 46 are typically made of a bar stock or tubing stock with a flat area that permits them to be mechanically and electrically coupled to corresponding horizontal bus conductors 48, 50 and 52 in the bus system.

Connection of component supports (such as mounted on plates or drawers, not shown) is made by two pronged stabs that are received through slots 28 and engage the individual bus bars behind the bus cover 54. As described above, the bus system 40 further includes bus support configured to support the vertical and horizontal bus conductors that is described in detail below with reference to FIGS. 3-7.

Figure 3:
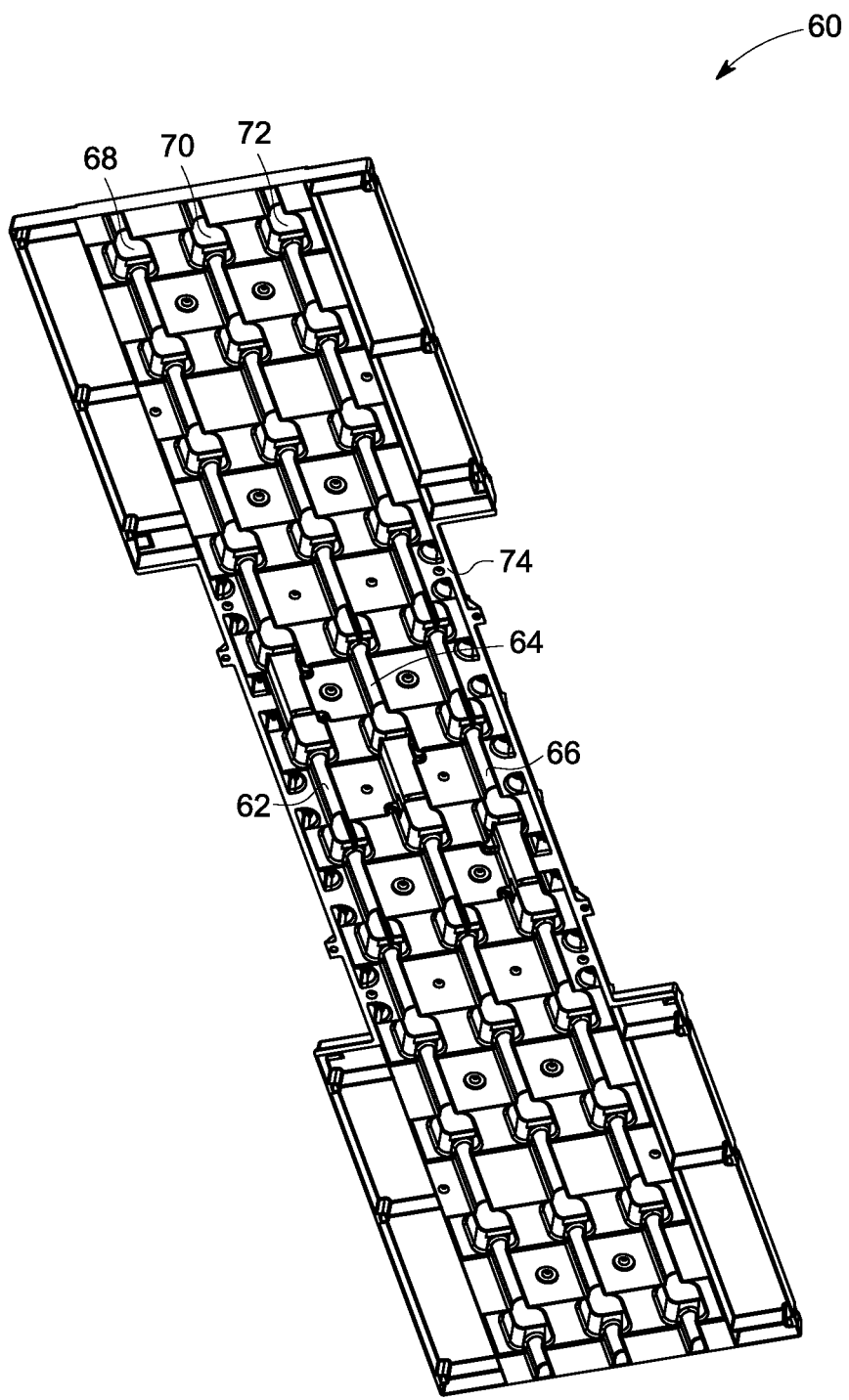
FIG. 3 illustrates an exemplary configuration of a front view of a bus support to support the power busses of bus system of FIG. 2.

FIG. 3 illustrates an exemplary configuration 60 of a front view of a bus support to support the power busses of the bus system 40 of FIG. 2. As illustrated, the bus support 60 includes a plurality of vertical channels such as represented by reference numerals 62, 64 and 66 to receive the vertical bus conductors 42, 44 and 46 of FIG. 2. Each of the plurality of vertical channels 62, 64 and 66 includes a rear protrusion such as represented by reference numerals 68, 70 and 72 on a rear side 74 of the bus support 60. In the illustrated embodiment, the bus support 60 mechanically supports the various horizontal and vertical bus conductors. Within the bus system 40, and generally between the bus support 60 and the bus cover 54 (see FIG. 2), each vertical bus conductor generally includes a connection portion that is engaged by stabs of component supports and a bus anchoring portion.

Figure 4:
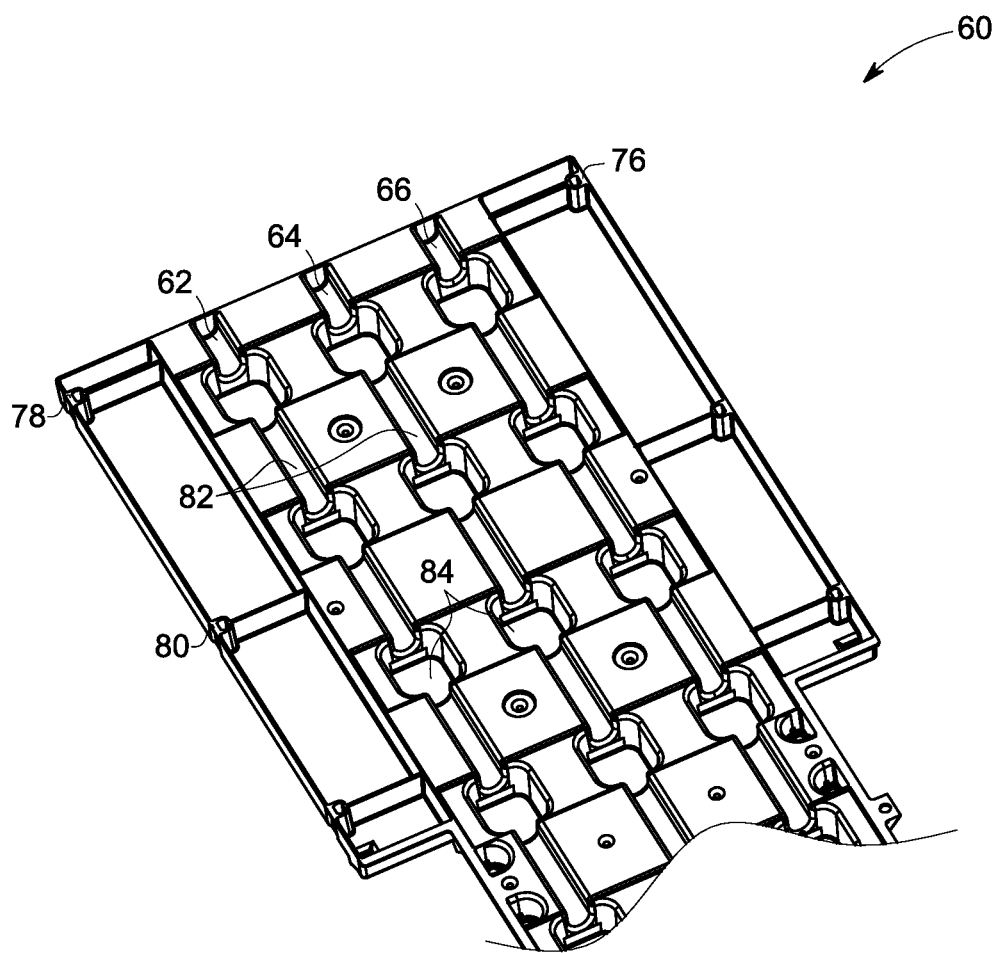
FIG. 4 is an elevational rear view of the bus support of FIG. 3.

An elevational rear view of the bus support 60 is shown in FIG. 4. As noted above, horizontal bus conductors such as 48, 50 and 52 (see FIG. 2) are generally supported on a rear surface of the bus support 60, while vertical bus conductors such as 42, 44 and 46 (see FIG. 2) are supported on a front surface thereof. In the illustrated embodiment, the bus support 60 includes a series of apertures or holes for receiving mounting bolts or screws, such as represented by reference numerals 76, 78 and 80. These apertures will generally be aligned with corresponding apertures in rear of the enclosure 10 to support the bus system 40 when mounted therein. The vertical bus conductors 42, 44 and 46 are received within corresponding recesses 82 of the vertical channels 62, 64 and 66. These recesses 82 are generally semicircular grooves in which the individual vertical bus conductors 42, 44 and 46 may lie.

Contiguous with, but somewhat deeper than these recesses 82, are a series of pockets 84. The pockets 84 are designed to receive and accommodate stabs (not shown) of component supports that will protrude through the slots in the bus cover 54. Furthermore, the bus support 60 includes a series of apertures (not shown) that extend completely through the bus support 60 for mechanical and electrical connection to horizontal bus conductors 48, 50 and 52.

In the illustrated embodiment, the bus support 60 is formed as a single piece of molded plastic material. The material is preferably one that will not degrade or melt with elevated temperatures that may occur during normal operation. In certain embodiments, the bus support 60 comprises glass filled polyester, a thermoset plastic. The bus support 60 includes a plurality of add-on bus support braces that will be described in greater detail below. In certain embodiments, the bus support 60 is configured to support 42 kA and 65 kA bus bracing. Such bus support 60 may then be augmented by add-on bus support braces described below to support a 100 kA bus bracing.

Figure 5:
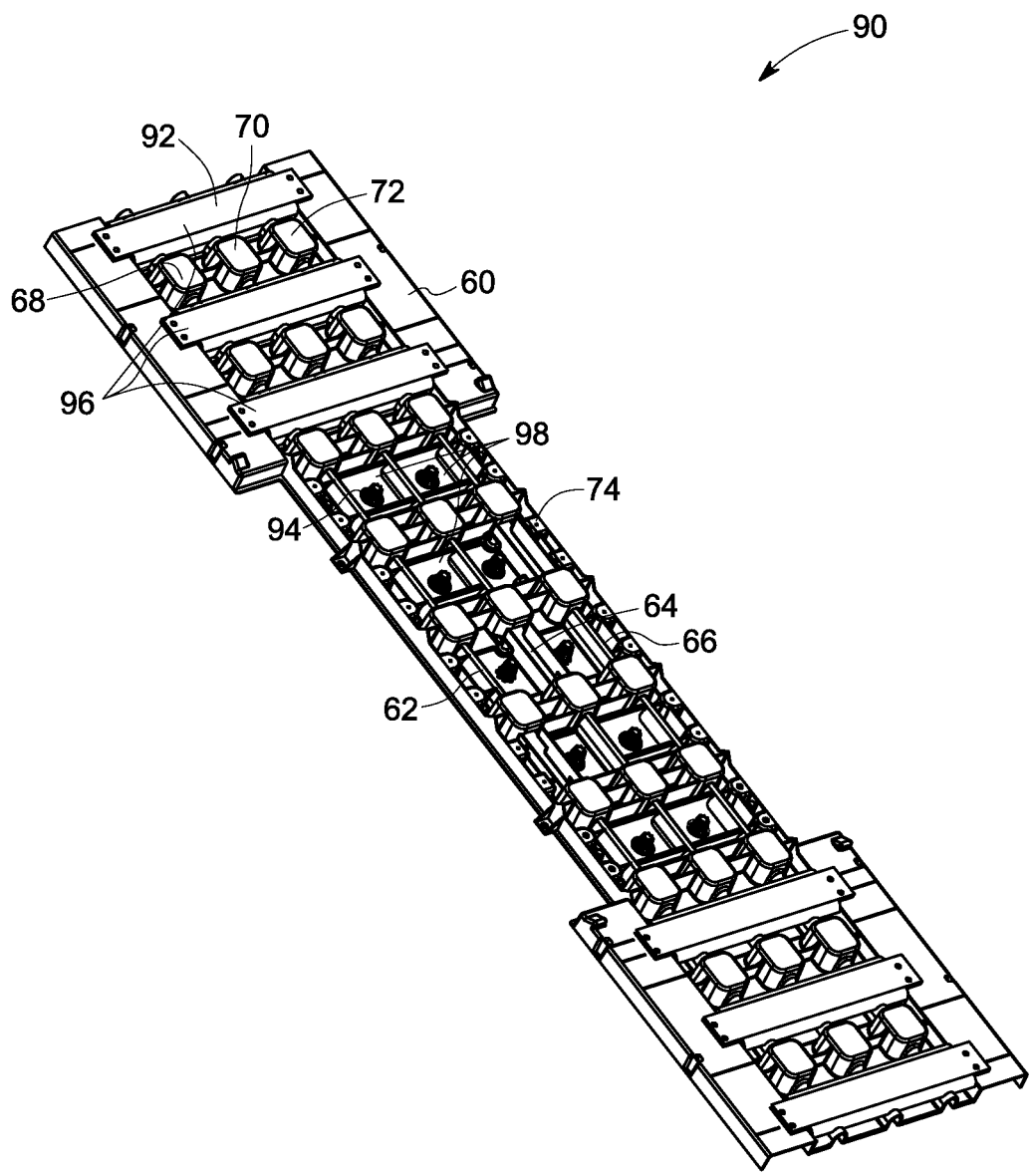
FIG. 5 illustrates an exemplary configuration of the bus support of FIG. 4 with the add-on bus support braces.

FIG. 5 illustrates an exemplary configuration 90 of the bus support 60 with the add-on bus support braces, such as represented by reference numerals 92 and 94. As illustrated, the plurality of add-on bus support braces 92 and 94 are disposed on the rear side 74 of the bus support 60 and are configured to contact the plurality of vertical channels 62, 64 and 66. The add-on bus support braces 92 and 94 are configured to limit a movement of the vertical bus conductors 42, 44 and 46 (see FIG. 2) during a high current event. In one exemplary embodiment, the bus support 60 with the plurality of add-on bus support braces 92 and 94 is able to withstand short circuit currents up to about 100 kA. In the illustrated embodiment, each of the add-on bus support braces 92 and 94 extends between vertical channels 62, 64 and 66 for three phase bus conductors.

In this exemplary embodiment, the bus support 60 includes a first set 96 of add-on bus support braces including the braces 92 that extend between three vertical channels 62, 64 and 64. Moreover, the bus support 60 includes a second set 98 of add-on bus support braces including the braces 94 that extend between two vertical channels such as between channels 62 and 64 or between vertical channels 64 and 66. In this exemplary embodiment, each of the first and second sets 96 and 98 of add-on support braces includes six braces to limit the movement of the vertical bus conductors 42, 44 and 46. However, the number of add-on bus support braces may vary based upon a configuration of the bus support 60.

Figure 6:
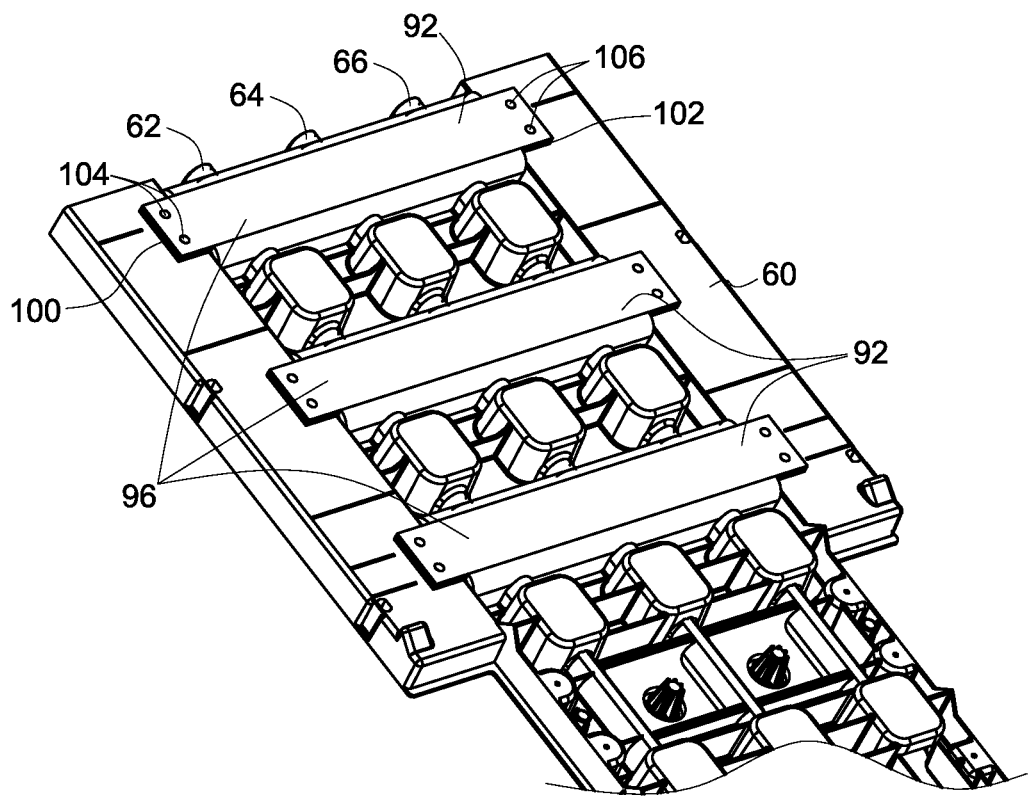
FIG. 6 is an elevational view of the bus support with a first set of add-on bus support braces in accordance with aspects of the present invention.

FIG. 6 shows an elevational view of the bus support 60 with the first set 96 of add-on bus support braces. As illustrated, each of the add-on bus support brace 92 extends between three vertical channels 62, 64 and 66. In this exemplary embodiment, each of the add-on support braces 92 includes side flanges 100 and 102 for coupling the braces 92 to the bus support 60. Each of these side flanges 100 and 102 includes apertures or holes 104 and 106 for receiving mounting bolts or screws for coupling the braces 92 to the bus support 60. However other coupling mechanisms for attaching the braces 92 to the bus support 60 may be envisaged.

Figure 7:
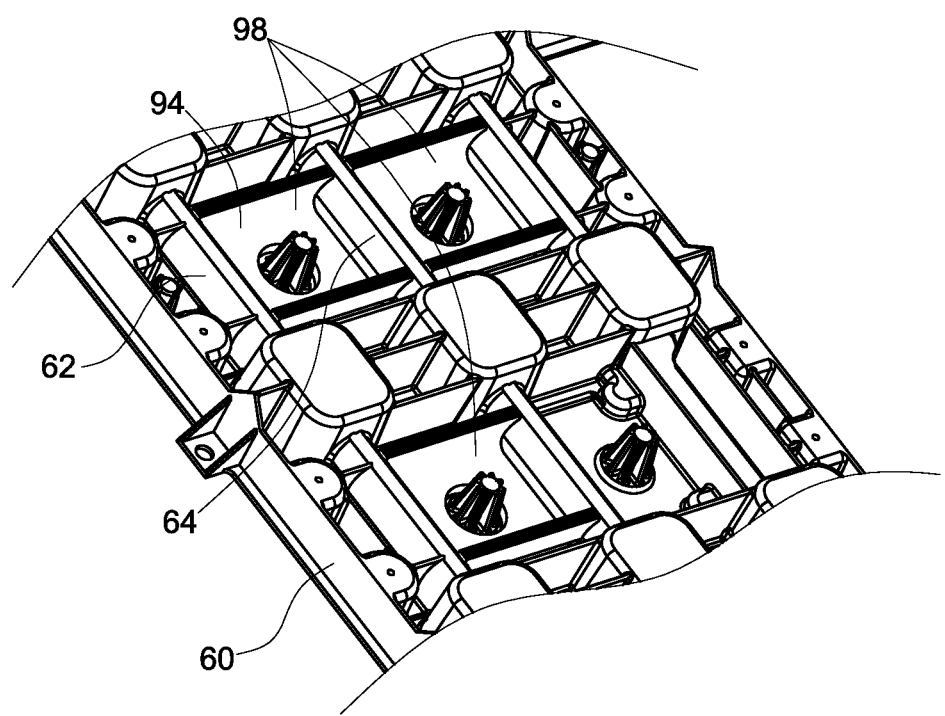
FIG. 7 is an elevational view of the bus support with a second set of add-on bus support braces in accordance with aspects of the present invention.

FIG. 7 shows an elevational view of the bus support 60 with the second set 98 of add-on bus support braces. As illustrated, each of the add-on bus support brace 94 extends between two vertical channels such as 62 and 64. In this exemplary embodiment, the brace 94 may be coupled to the bus support 60 via an adhesive. However, other coupling mechanisms may be employed. In the illustrated embodiment, the second set 98 of add-on support braces 94 is held in place between the horizontal bus conductors 48, 50 and 52 (see FIG. 2).

Figure 8:
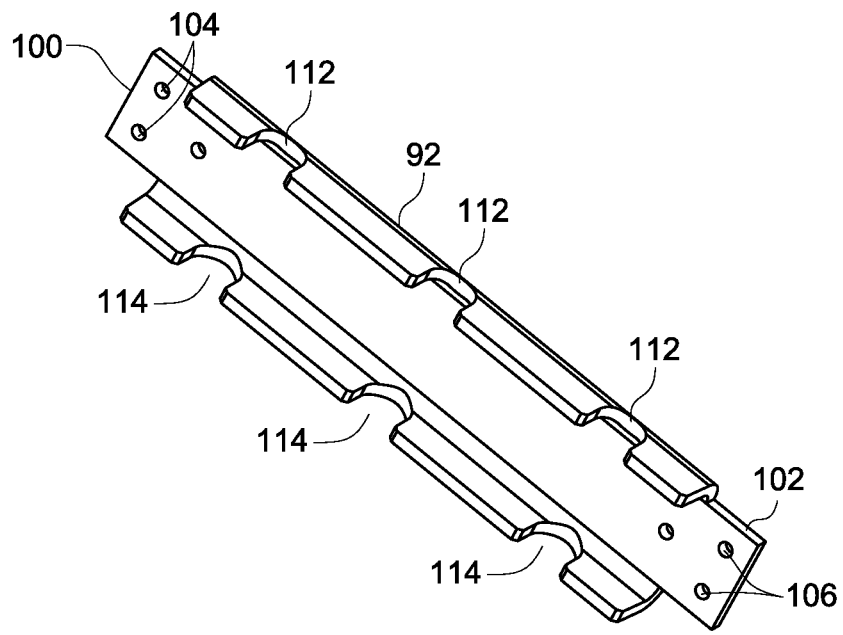
FIG. 8 illustrates an exemplary configuration of the brace of FIG. 6 in accordance with aspects of the present invention.

FIG. 8 illustrates an exemplary configuration of the brace 92 of FIG. 6. As illustrated, the brace 92 includes a channel shaped structure and includes the side flanges 100 and 102 for coupling the brace 92 to the bus support. Each of the side flanges 100 and 102 include apertures or holes 104 or 106 for receiving mounting bolts or screws for the attaching the brace 92 to the bus support 60. Moreover, the brace 92 includes recesses, such as generally represented by reference numerals 112 and 114 that partially surround the vertical channels 62, 64 and 66. In certain embodiments, the brace 92 includes a thermosetting material. In one exemplary embodiment, the brace 92 includes glass reinforced polyester.

In the illustrated embodiment, each of the braces 92 may be contoured to align with corresponding vertical channels 62, 64 and 66 of the bus support 60. In particular, design parameters of the brace 92 may be selected based upon the dimensions of the bus support 60 and the vertical channels 62, 64 and 66. Examples of such parameters include, but are not limited to, a width of the brace 92, a diameter of each of the semicircular recesses 112 and 114, a location of each of the apertures or holes 104 and 106 and so forth.

Figure 9:
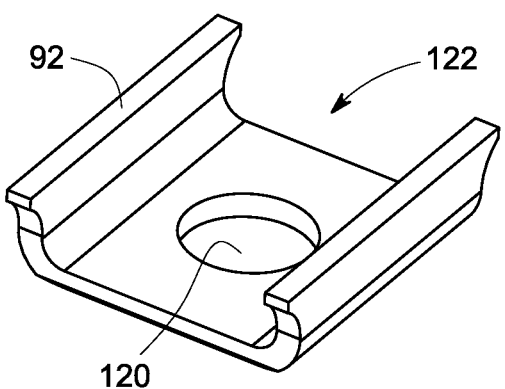
FIG. 9 illustrates an exemplary configuration of the brace of FIG. 7 in accordance with aspects of the present invention.

FIG. 9 illustrates an exemplary configuration of the brace 94 of FIG. 7. As illustrated, the brace 94 is a channel shaped structure with an opening 120 at the center of the brace 94. Further, the brace 94 includes recesses, such as represented by reference numeral 122 that partially surround corresponding two vertical channels such as 62 and 64 or 64 and 66. In this exemplary embodiment, the brace 94 includes glass reinforced polyester. Again, the parameters of the brace 94 may be selected based upon the dimensions of the bus support and the corresponding vertical channels such as 62, 64 or 64 and 66. Examples of such parameters include, but are not limited to, a width of the brace 94, a diameter of each of the semicircular recesses 122, a diameter of the opening 120 and so forth.

As will be appreciated by those skilled in the art, in the event of a high current event, electromagnetic forces will be created between and among the conductors that make up the buses, and particularly those of the vertical buses, which result in bending and deforming the conductors and even deforming and breaking support structures (e.g., holding brackets, etc.).

The various aspects of the structures described hereinabove may be used with conventional component supports, such as those typically found in motor control centers and other systems. As described above, the technique utilizes add-on bus support braces to limit movement of bus conductors during a high current event in such systems. As will be appreciated by those skilled in the art, in the event of a high current event, electromagnetic forces will be created between and among the conductors that make up the buses, and particularly those of the vertical buses, which result in bending and deforming the conductors and even deforming and breaking support structures (e.g., holding brackets, etc.). Advantageously, the existing bus support system for 42 kA/65 kA may be utilized (allowing for economies realized by an overall reduction in the number of different support systems) by incorporating such add-on bus support braces, and can be employed for 100 kA bus bracing while adequately resisting deformation or damage of the vertical bus conductors and support structures. The bus support system with the add-on bus support braces also has substantially less weight as compared to individual support system for the 100 kA bus.

Furthermore, use of such add-on bus support braces eliminates the need of steel backing plates thereby allowing cabling to horizontal bus conductors on frame mounted units. In addition, this technique enables reduction of height of bus cover braces to eliminate possible interference with a unit stab assembly. The existing bus support structure for 42 kA/65 kA is modified with such add-on bus support braces thereby eliminating losses due to low usage of the 100 kA bus support and cost of any additional parts otherwise required for supporting the 100 kA bus.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A bus support system, comprising:
  a bus support having a plurality of vertical channels configured to receive vertical bus conductors, each of the plurality of vertical channels having a rear protrusion on a rear side of the bus support, wherein the rear side of the bus support is opposite a side of the bus support having openings of the plurality of vertical channels; and
  a plurality of add-on bus support braces disposed on the rear side of the bus support and configured to contact the protrusions of the plurality of channels to limit movement of the vertical bus conductors during a high current event.

2. The bus support system of claim 1, wherein each of the plurality of add-on bus support braces extends between vertical channels for three phase conductors.

3. The bus support system of claim 2, wherein the plurality of add-on bus support braces comprise a first set of add-on bus support braces configured to extend between three vertical channels and a second set of add-on bus support braces configured to extend between two vertical channels.

4. The bus support system of claim 3, wherein each of the first set of add-on bus support braces comprises side flanges to couple each of the braces to the bus support.

5. The bus support system of claim 4, wherein each of the first set of add-on bus support braces is bolted to the bus support.

6. The bus support system of claim 3, wherein each of the second set of add-on bus support braces is coupled to the bus support via an adhesive.

7. The bus support system of claim 3, wherein the second set of add-on bus support braces is held in place between the vertical bus conductors.

8. The bus support system of claim 2, wherein each of the plurality of add-on bus support braces includes recesses that partially surround the protrusions of the vertical channels.

9. The bus support system of claim 1, wherein each of the plurality of add-on bus support braces comprise channel shaped braces.

10. The bus support system of claim 1, wherein the plurality of add-on bus support braces comprise a thermosetting polymer material.

11. The bus support system of claim 9, wherein the plurality of add-on bus support braces comprise glass reinforced polyester.

* * * * *